United States Patent [19]

Kisami

[11] 4,307,300

[45] Dec. 22, 1981

[54] DUMP TRUCK WITH SAFETY CIRCUIT

[75] Inventor: Nobuyuki Kisami, Yokohama, Japan

[73] Assignee: Kabushiki Kaisha Komatsu Seisakusho, Tokyo, Japan

[21] Appl. No.: 143,782

[22] Filed: Apr. 25, 1980

Related U.S. Application Data

[63] Continuation-in-part of Ser. No. 882,561, Mar. 2, 1978.

[51] Int. Cl.³ ............................................. B60K 28/00
[52] U.S. Cl. ........................................ 307/9; 307/328; 180/272
[58] Field of Search .................... 307/9, 10 R, 328; 318/760, 63, 269, 271; 180/65 C, 271, 272

[56]     References Cited
       U.S. PATENT DOCUMENTS

| | | | |
|---|---|---|---|
| 2,084,371 | 6/1937 | Aikman | 290/38 E |
| 2,393,618 | 1/1946 | Edwards et al. | 318/57 |
| 2,419,178 | 4/1947 | Strong | 318/95 |
| 3,348,623 | 10/1967 | Potter | 180/65 R |
| 3,521,723 | 7/1970 | Snodgras | 180/269 |
| 3,914,735 | 10/1975 | Guillaume | 340/52 F |
| 4,051,915 | 10/1977 | Behrens | 307/10 R |
| 4,119,861 | 10/1978 | Gocho | 290/13 |

Primary Examiner—L. T. Hix
Assistant Examiner—James L. Dwyer
Attorney, Agent, or Firm—Spensley, Horn, Jubas & Lubitz

[57]     ABSTRACT

An electrical circuit for driving an electrically driven vehicle such as a dump truck is capable of preventing occurrence of accidents caused by an erroneous operation and thereby increasing safety by providing an arrangement such that the vehicle cannot start unless all necessary operations have been completed before starting. For this purpose, a power source of a control box controlling an exciting current for a generator is turned on to generate the exciting current only when all necessary operations have been completed. This is achieved by connecting a plurality of switches corresponding to various operations in series to a power source relay and thereby causing the power source relay to be actuated upon closing of all of these switches. The circuit also enables the motors to be utilized as generators to provide dynamic braking for the truck.

6 Claims, 2 Drawing Figures

DUMP TRUCK WITH SAFETY CIRCUIT

This is a continuation-in-part of U.S. Patent application Ser. No. 882,561 filed Mar. 2, 1978.

BACKGROUND OF THE INVENTION

1. Field of the Invention

This invention relates to an electrical safety circuit for driving an electrically driven vehicle such as a dump truck. More particularly, this invention relates to a circuit for use in dump trucks of the type used in strip mining operations. Such dump trucks are extremely large (over 100 ton payload capacity) and therefore potentially dangerous, and the inclusion of safety features is thus very important.

2. Description of the Prior Art

A conventional electrical circuit for driving such a vehicle is not coupled in a sequence or interlock circuit relation to other electrical circuits of the vehicle such as brake and dump controls which are provided separately from the driving circuit. This causes various problems, including the following ones:

(a) The vehicle starts moving if an operator erroneously depresses an accelerator pedal without releasing a parking brake with the result being that a parking brake drum is burnt.

(b) If a driver of a dump car working in a dumping place erroneously depresses the accelerator pedal while operating a dump control lever without having shifted a forward-reverse movement change lever from a reverse position to a neutral position, the dump truck moves in reverse, which gives rise to the danger that the truck will fall into the dump pit.

It is, therefore, an object of the present invention to provide an electrical circuit for driving a dump truck which eliminates the above described problems inherent in conventional electrical driving circuits.

It is another object of the invention to provide an electrical circuit for driving an electrically driven dump truck capable of preventing an erroneous starting of the vehicle by maintaining a control circuit in the electrical driving circuit disconnected from its power source unless the operator operates the vehicle correctly.

It is yet another object of the invention to provide a dump truck which includes a safety control circuit in combination with a dynamic braking system, thereby maximizing the safety of the dump truck.

SUMMARY OF THE INVENTION

According to the invention, there is provided an electrical circuit for driving an electrically driven dump truck of a type wherein drive motors are driven by the output of a generator which is driven by an engine. The generator is controlled by an exciting current provided by a control box comprising a safety interlock circuit in which a plurality of switches, corresponding to operations to be performed before movement of the vehicle, are connected in series to a power source relay in the control box. A power source for the control box is connected upon closing of all of the switches to provide the exciting current to the generator and thereby to enable the motors to be driven by the output of the generator for starting the vehicle. The switches include a starting switch, a control power switch coupled to the dumping control and an engine idle switch which are closed upon performing of respective operations, a parking brake switch which is closed upon release of a parking brake and a brake lock switch which is closed upon the release of a brake pedal or the like. The dump truck uses dynamic braking, i.e., the drive motors are utilized as generators during braking to dissipate kinetic energy of the truck. The brake lock switch prevents driving current from being supplied to the motors during dynamic braking.

DESCRIPTION OF THE PREFERRED EMBODIMENT

Figure 1:
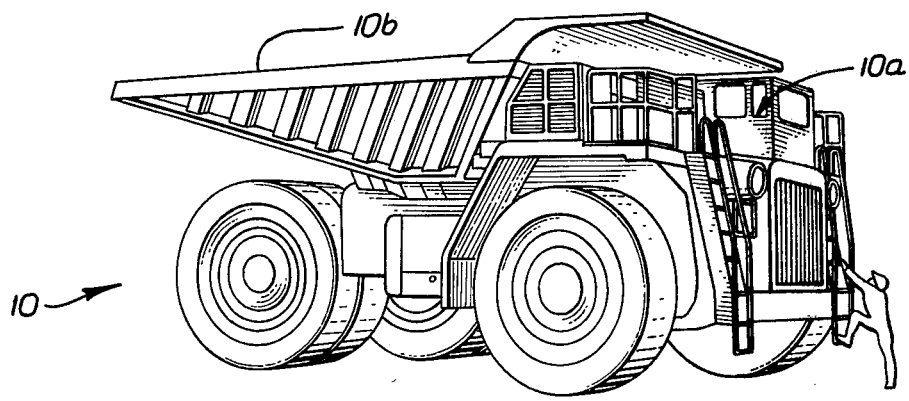
FIG. 1 shows a dump truck which utilizes the control circuit of the present invention.

Referring to FIG. 1, a dump truck 10 of the type used for strip mining operations or the like is shown. The truck 10 has a payload capacity of approximately 130 tons. The truck is driven via its rear wheels by means of electric drive motors. In order to provide maximum safety, a dynamic braking system utilizing the drive motors as generators to dissipate kinetic energy of the truck is employed in addition to standard shoe-type brakes.

In addition to the use of dynamic braking, the truck 10 has a safety interlock system which operates in conjunction with the brakes to further insure the safety of the truck. The safety interlock prevents driving power from being applied to the motor if either the emergency or regular (dynamic and shoe type) brakes are engaged, or if a dumping operation is in progress. Thus, the safety of the truck is greatly increased, particularly with respect to the prevention of movement of the truck while dumping is in progress.

Figure 2:
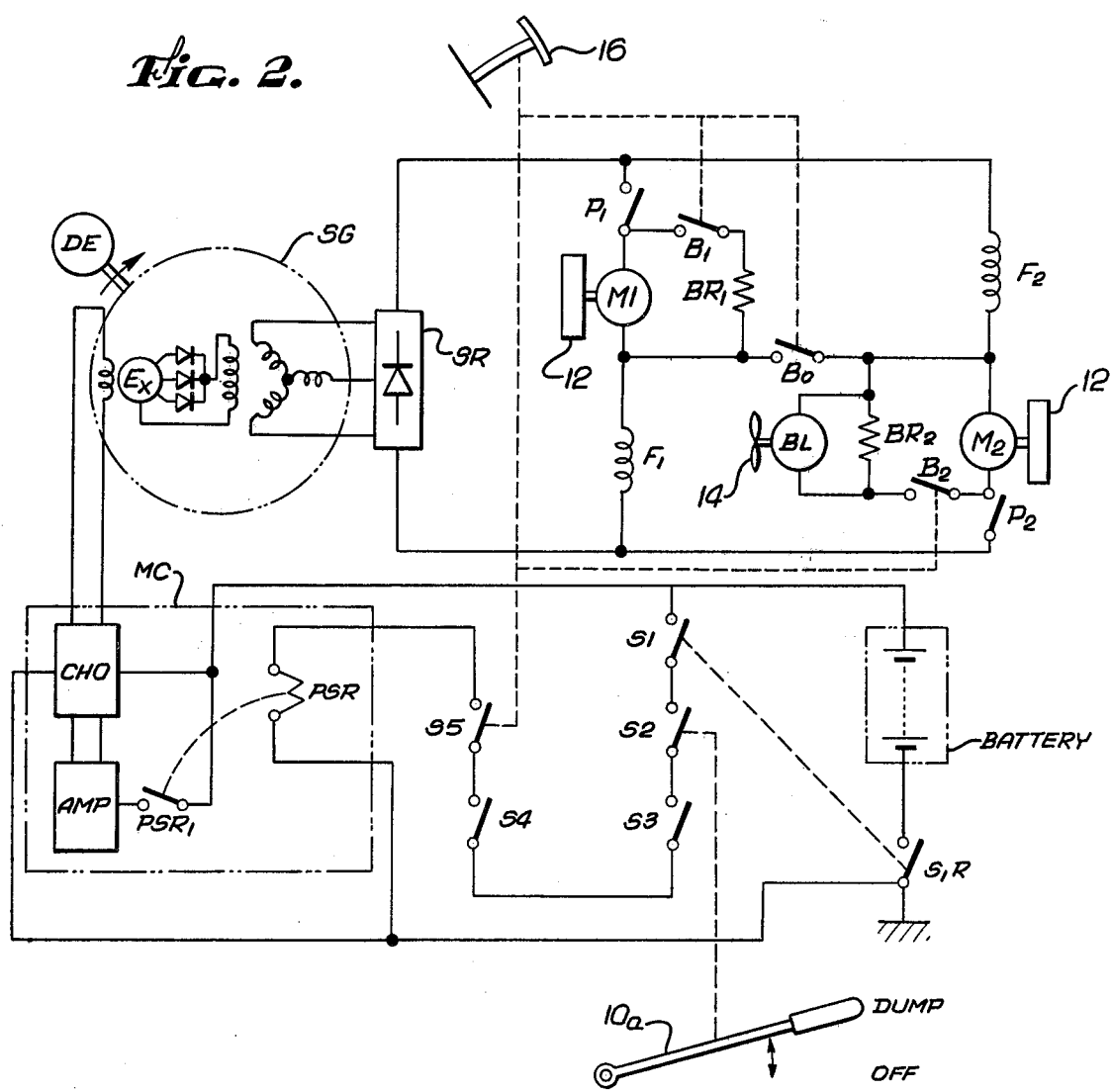
FIG. 2 is a schematic diagram of the control circuit of the present invention.

Referring now to FIG. 2, an alternating current generated by an AC generator SG which is driven by a diesel engine DE is rectified into a direct current by a rectifier SR and thereafter flows to armatures M1, M2 and field coils F1, F2 of electric motors coupled to left and right drive wheels 12 of the truck 10, respectively. The driving of the electric motors is controlled by the actuation of electromagnetic contactors P1 and P2 for an accelerating function and electromagnetic contactors B0, B1 and B2 for a dynamic braking function. The contactors B0, B1 and B2 are controlled by a brake pedal 16 or the like. Reference characters BR1 and BR2 designate resistors which absorb energy from the armatures M1, M2 during dynamic braking and a blower motor BL which drives a blower 14 which cools the resistors.

In running the vehicle, an accelerator switch (not shown) is turned on to close the accelerator contactors P1 and P2 to connect the motors in parallel. In braking the vehicle electrically (dynamically), the accelerator is released, opening contactors P1 and P2 and a brake switch or pedal 16 is turned on to close the brake contactors B0, B1 and B2. The armatures M1 and M2 then act as generators, and kinetic energy of the truck 10 is dissipated in the resistors BR1 and BR2, which are cooled by the blower BL.

The AC generator SG is controlled by controlling an exciter EX by means of a control current supplied by a control box MC. The control current varies in proportion to depression angle of a pedal (not shown) for actuating the accelerator switch.

In the control box MC, there are provided choppers CHO, an exciter field control amplifier AMP, a power source relay PSR and a power source relay switch PSR1 coupled to the power source relay PSR. The power source relay PSR is connected to a power source BAT through a starting switch S1, a dump control switch S2, an engine idle switch S3, a parking brake switch S4 and a brake lock switch S5 connected in series. A battery relay switch S1R is coupled to the starting switch S1 so that engagement of the starting switch S1 causes the battery relay switch S1R to be closed and thereby causes the circuit including the power source BAT to be closed and the diesel engine DE to be started. The dump control switch S2 is provided for supplying and interrupting the current to the control box MC. The dump control switch opens during dumping may be connected to either a dump control lever 10a located in the cab of the truck 10 or to the dump box 10b of the truck 10. When the dump control switch is opened, no driving current will be provided and the truck 10 cannot move even if it is in gear and the accelerator is pressed. This feature greatly increases the safety of the truck. The engine idle switch S3 closes when the revolution rate of the diesel engine DE reaches a set rate. When the parking brake of the truck is applied the switch S4 is opened whereas when the regular brakes are engaged the switch S5 is opened. Simultaneously, the contactors B0, B1 and B2 are closed. The parking brake switch S4 and the brake lock switch S5 are composed of normally closed contact type switches. In the circuit of FIG. 2, the brake pedal 16 is disengaged, and the contactors B0, B1 and B2 are therefore opened and the switch S5 is closed. In addition, the accelerator pedal is disengaged and the contactors P1 and P2 are therefore opened.

If any one of the switches S1 through S5 connected in series to the power source relay PSR is open, the power source relay PSR is OFF so that the exciter EX is not excited even though the diesel engine DE is driven and the AC generator SG is thereby rotated. Accordingly, the AC generator SG does not produce an output and the vehicle cannot start to move. Thus, an erroneous starting of the vehicle by an operator caused by failure in following a correct process of operations before starting can be prevented. In order for the truck to be able to move, the starting switch S1 must be closed so as to start the diesel engine DE, the diesel engine must reach a predetermined rpm level, the dump box must be down or the dump lever disengaged, the parking brake released and the regular brakes released. Once the truck is moving, engagement of the brake pedal or switch will open the switch S4, thereby removing current from the exciter EX, and close the switches B0, B1 and B2, thereby activating the dynamic braking function. The control circuit thus enables a dump truck to be operated with maximum safety.

I claim:

1. A circuit for a dump truck which is driven by at least one electric motor which is powered by a generator, said dump truck having a brake pedal or the like, a dumping mechanism and a dump control lever or the like, comprising:
    a control circuit for providing a control current to the generator, said control circuit including a first safety switch which is activated to interrupt the control current upon the application of the brake pedal;
    at least one switch for connecting the electric motor as a generator to provide dynamic braking, said at least one switch being activated upon the application of the brake pedal; and
    a second safety switch in said control circuit, connected to the dumping mechanism or dump control lever, which is activated to interrupt the control current when a dumping operation is being performed, activation of said second safety switch preventing powering of the motor by the generator, thereby preventing accidental movement of the truck during dumping whether or not the brake pedal is applied.

2. A safety interlock circuit for use in a dump truck which is electrically driven by means of at least one electric motor, comprising:
    a generator for driving the electric motor;
    a diesel engine for driving the generator;
    an exciter for controlling the generator;
    an exciter control circuit for providing a controlling current to the exciter, said control circuit including a power source relay, a power source connected via the power source relay to provide exciting current for the generator, and a plurality of safety interlock switches connected in series between the power source relay and the power source, the opening of any of the switches preventing the generation of the exciting current, said switches including:
        a starting switch which is closed upon the starting of the diesel engine;
        a dump control switch which is closed when the dump truck is not performing a dumping function;
        an engine idle switch which is closed when the diesel engine reaches a predetermined revolution rate;
        a parking brake switch which is closed when a parking brake in the dump truck is released; and
        a standard brake switch which is closed upon the release of a brake pedal or the like;
    a plurality of motor contactors which are closed upon the pressing of an accelerator pedal or the like to couple the motors to the generator;
    a plurality of brake resistors;
    a blower for cooling the brake resistors; and
    a plurality of brake contactors which are closed upon the application of the brake pedal to connect the motors to the brake resistors, the motors thereby acting as generators and enabling kinetic energy of the truck to be dissipated in the resistors.

3. The safety interlock circuit of claim 2 wherein said generator is an AC generator and said exciter control circuit includes an exciter field control amplifier and a chopper, closure of said safety interlock switches providing DC power to said amplifier and chopper, said amplifier and chopper in turn providing AC exciting current to the exciter.

4. The circuit of claim 3 wherein the power source is a DC battery and including a second relay actuated by the operation of the starting switch, the contacts of said second relay being connected in series with the battery so that DC voltage is supplied to the amplifier and chopper only when said starter switch has been operated so as to actuate said second relay.

5. The circuit of claim 2 wherein the dump control switch is coupled to the dump box of the truck.

6. The circuit of claim 2 wherein the dump control switch is coupled to a dump control lever in the truck.

* * * * *